July 6, 1926.
C. A. NEAL
PACKING
Filed June 6, 1925
1,591,876
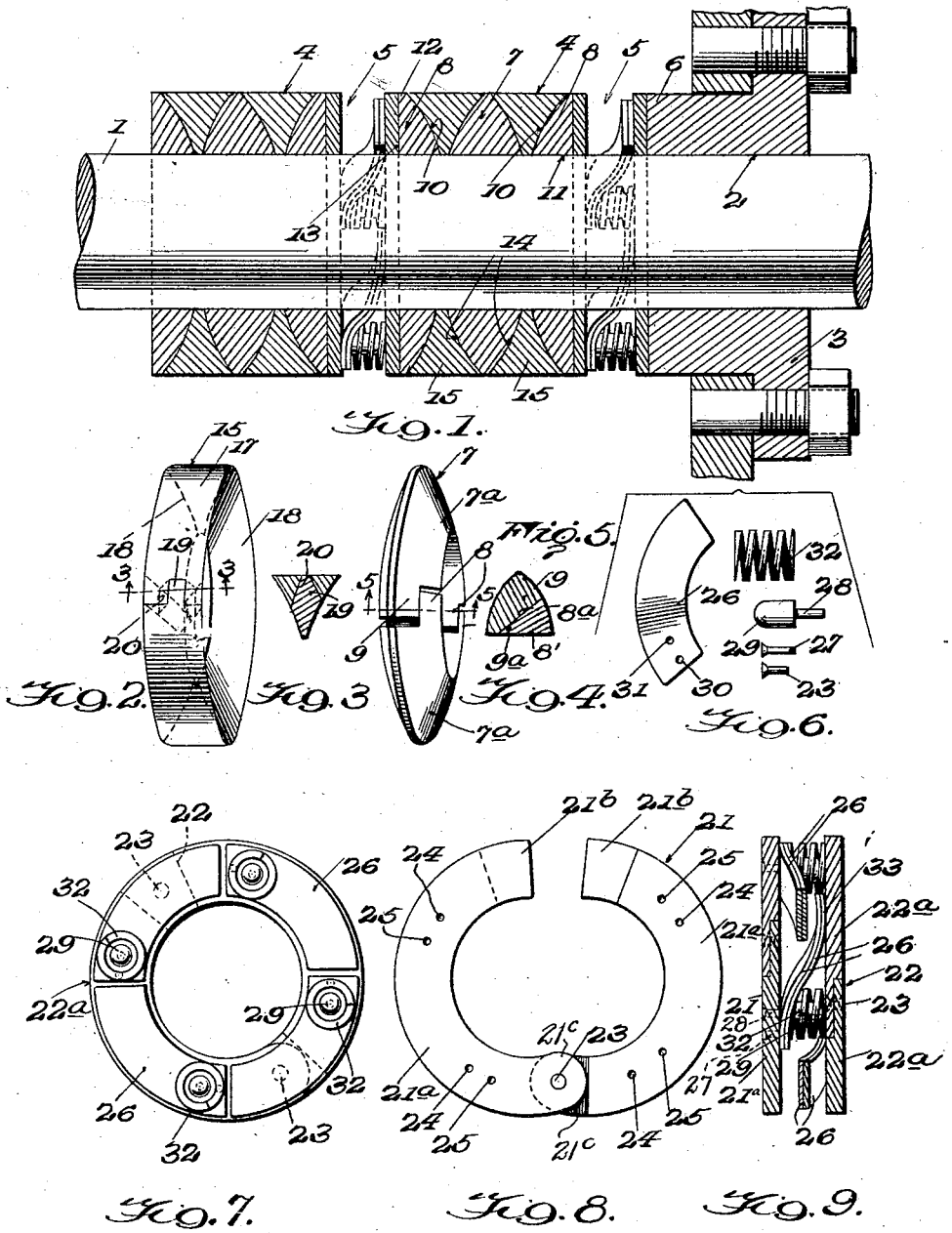
WITNESSES
INVENTOR
C. A. NEAL,
BY
ATTORNEYS Patented July 6, 1926.

1,591,876

UNITED STATES PATENT OFFICE.

CLARENCE ALFRED NEAL, OF ROCK MART, GEORGIA.

PACKING.

Application filed June 6, 1925. Serial No. 35,312.

My invention relates to a packing which is especially adapted for use on a piston rod, valve rod, a plunger of any one of the various types of compressors, or the like.

An object of the invention is to provide a packing which is automatically self-adjusting to compensate for wear on the relatively moving parts thereof or on the relatively moving surfaces of the packing and the rod or plunger on which the packing is mounted as well as for temperature changes or vibration of the rod or plunger on which the packing is used.

A further object of the invention is the provision of a packing which is leak-proof.

A further object of the invention is the provision of a packing which will function effectively as a packing for a moving rod or plunger with but relatively little wear on the packing or the rod or plunger on which the packing is mounted.

A still further object of the invention is the provision of a packing which is compact in form, simple in construction, reliable in use and thoroughly practical commercially.

Other objects and advantages of the invention will be apparent from the following description, considered in conjunction with the accompanying drawings, in which—

Figure 1 is a vertical section through the improved packing as applied to a piston rod and in association with a cylinder head, Figure 2 is a perspective view of a draft ring which is comprised in the improved packing, Figure 3 is a section through the lapped meeting end portions of the draft ring, the view being taken substantially along the line 3—3 of Fig. 2, Figure 4 is a perspective view of an inner or sealing ring for cooperating with the draft ring shown in Fig. 2, Figure 5 is a section through lapped meeting end portions of sections of the sealing ring shown in Fig. 4, the view being taken substantially along the line 5—5 of Fig. 4, Figure 6 is a group view showing a spring leaf, a coil spring and certain associated elements of an expansion spring assembly which is comprised in the improved packing, Figure 7 is a face view of the spring supporting ring of the expansion spring assembly with the springs in place thereon, Figure 8 is a view similar to Fig. 7, showing the ring for supporting the springs with the springs omitted, and Figure 9 is a transverse vertical section through the complete expansion spring assembly.

In Fig. 1, the numeral 1 designates a rod which protrudes from an opening 2 in a supporting member 3. The rod 1 may be a piston rod and the member 3 may be the head of a cylinder, not shown, with which the piston rod is associated.

The improved packing may comprise any desirable number of packing units 4, two of which are shown on the rod 1 in Fig. 1. A spring expansion unit or assembly 5 is provided on the rod 1 between adjacent packing units 4 and between a packing unit 4 and an adjacent stop, such as the boss 6 on the head 3 in Fig. 1.

Each packing unit 4 comprises one or more wearing rings having relatively wide inner faces and narrower outer faces. The packing unit 4 shown in Fig. 1 comprises a middle wearing ring, indicated at 7 and a pair of end wearing rings 8. The wearing ring 7 comprises two identical complementary segmental sections 7$^a$, each of which is formed with a sealing extension or tongue 8' at the inner edge of one end thereof adapted to complement and overlap a sealing tongue or extension 9 on the opposite end of the other section, the lapped sealing extensions 8' and 9 having flat contacting faces 8$^a$ and 9$^a$, respectively, sliding flatwise on each other in a plane which is oblique to the axis of the ring 7.

Each of the rings 8 is formed of two complementary segmental sections which cooperate with each other in the same manner as the sections of the ring 7. The rings 8 differ from the ring 7 only in that each ring 8 has the inner side face 10 thereof curved convexly radially thereof from the relatively wide inner peripheral wall 11 to the narrow outer peripheral wall 12 of the ring 8 and the outer side face 13 of the ring 8 is flat and lies in a plane extending at right angles to the inner and outer peripheral walls of the ring 8 while the ring 7 has both side faces thereof, indicated at 14, convexly curved radially thereof and similar to the convexly curved face 11 of the ring 8.

Each packing unit also includes a draft ring 15 encircling the rod 1 between each two adjacent wearing rings. Each draft ring 15 has a relatively narrow inner peripheral wall 16, a wider outer peripheral wall 17 and the side faces of each draft ring are concavely curved radially thereof as indicated at 18 to complement the convexly curved side faces of the adjacent wearing rings. Each draft ring 15 is of the split ring type and has an extending sealing tongue 19 at one end thereof fitting slidably and snugly in a slot 20 in the other end of the draft ring. The tongue 19 increases in width from its outer face to its inner face in the manner of a dove-tail while the slot 20 likewise increases in width inwardly from the outer peripheral face of the draft ring.

Each expansion spring unit or assembly comprises a pair of rings 21 and 22, respectively, each of which comprises a pair of cooperative segmental sections as indicated at 21$^a$ for the ring 21 in Fig. 8 and at 22$^a$ for the ring 22 in Fig. 9, such sections having lapped end portions such as indicated at 21$^b$—21$^b$ and 21$^c$—21$^c$ for the ring 21 in Fig. 8, the lapped end portions 21$^c$—21$^c$ being connected by a pivot element 23 which is parallel to the axis of ring 21. The lapped end portions of the ring 22 corresponding to the lapped end portions 21$^c$—21$^c$ also are connected with each other by one of the pivot elements 23. The ring 21 is provided at regularly spaced intervals with pairs of adjacent transverse openings 24 and 25, respectively. Leaf springs, each of which comprises a plurality of superposed spring leaves 26, have corresponding end portions thereof secured by rivets 27 and the shanks 28 of combined stops and guides 29 to the inner face of the ring 21, the rivets 27 extending through the openings 25 in ring 21 and alined openings 30 in the leaves of the leaf springs while the shanks 28 extend through the openings 24 and through openings 31 in the leaves of the leaf springs, the combined stops and guides being disposed between the attached ends of the leaf springs and the ring 22. A coil spring 32 encircles each stop and guide and is adapted to be placed under compression when the rings 21 and 22 of each expansion unit move axially toward each other from the position shown in Fig. 9. The leaves 26 of each leaf spring have the inner and outer edges thereof curved to lie substantially in arcs of circles struck by radii about centers lying in the axis of the expansion unit and the leaf springs curve longitudinally from their attached ends toward the ring 22 for the greater part of their length and then are curved reversely adjacent to their free ends, thus producing substantially flat contact end portions at 33 which bear against the inner face of the ring 22. The stops and guides 29 limit the movement of the rings 21 and 22 of each expansion unit toward each other and therefore prevent undue compression of the coil springs 32 and undue strain of the leaf springs.

From the foregoing description of the various parts of the device, the operation thereof will be readily understood. The draft rings preferably are formed of tough fiber, asbestos, duck, or the like while the wearing rings preferably are made of soft metal or fiber. The expansion units will act continuously to hold adjacent faces of the draft and wearing rings in close contact with each other and any adjustment required between adjacent draft and wearing rings to compensate for wear, temperature changes, vibrations, etc. will be automatic. Since the rings of the packing are formed of sections, it is obvious that the packing can be applied to or removed from a piston rod or like rod or shaft without disconnecting the shaft from the parts with which it is associated. Each ring of the packing unit is leak-proof since the meeting end portions of the ring contact with each other in such manner as to provide a fluid tight joint and the respective rings of the packing unit likewise contact with each other in such manner as to produce a leak-proof packing unit.

Obviously, the invention is susceptible of embodiment in forms other than that which is illustrated in the accompanying drawings and I therefore consider as my own all such modifications and adaptations thereof as fairly fall within the scope of the appended claims.

I claim:

1. A packing unit comprising a plurality of wearing rings tapering radially outward, a draft ring tapering radially inward and overlapping adjacent wearing rings, expansion spring means at opposite ends of said packing unit, each draft ring being of the split ring type and having an outwardly tapering dove tail extension at one end thereof fitting slidably in an outwardly tapering dove-tail slot in the other end of the ring.

2. A packing unit comprising a plurality of wearing rings tapering radially outward, a draft ring tapering radially inward and overlapping adjacent wearing rings, and expansion spring units at opposite ends of the packing unit, each expansion spring unit comprising a pair of rings, spaced leaf springs each attached at one end to one of said rings and in contact adjacent to its opposite end with the inner face of the other ring of the spring unit, and coil springs disposed between the attached ends of the leaf springs and the adjacent ring of the spring unit.

3. A packing unit comprising a plurality of wearing rings tapering radially outward, a draft ring tapering radially inward and overlapping adjacent wearing rings, and expansion spring units at opposite ends of the packing unit, each expansion spring unit comprising a pair of rings, spaced leaf springs each attached at one end to one of said rings and in contact adjacent to its opposite end with the inner face of the other ring of the spring unit, and coil springs disposed between the attached ends of the leaf springs and the adjacent ring of the spring unit, said leaf springs having arcuately curved inner and outer edges lying substantially in arcs of circles struck by radii about centers lying in the axial line of said rings of the spring unit.

4. A packing unit comprising a plurality of wearing rings tapering radially outward, a draft ring tapering radially inward and overlapping adjacent wearing rings, and expansion spring units at opposite ends of the packing unit, each expansion spring unit comprising a pair of rings, spaced leaf springs each attached at one end to one of said rings and in contact adjacent to its opposite end with the inner face of the other ring of the spring unit, coil springs disposed between the attached ends of the leaf springs and the adjacent ring of the spring unit and stops encircled by said coil springs and disposed between the rings of the spring unit.

5. A packing unit comprising a plurality of wearing rings tapering radially outward, a draft ring tapering radially inward and overlapping adjacent wearing rings, and expansion spring units at opposite ends of the packing unit, each expansion spring unit comprising a pair of rings, spaced leaf springs each attached at one end to one of said rings and in contact adjacent to its opposite end with the inner face of the other ring of the spring unit, and coil springs disposed between the attached ends of the leaf springs and the adjacent ring of the spring unit, each of said rings of the spring unit comprising a pair of sections hinged together and being adapted to overlap at their free ends.

CLARENCE ALFRED NEAL.